W. R. CLOSE.
Ox-Yoke.
No. 47,523.
Patented May 2, 1865.
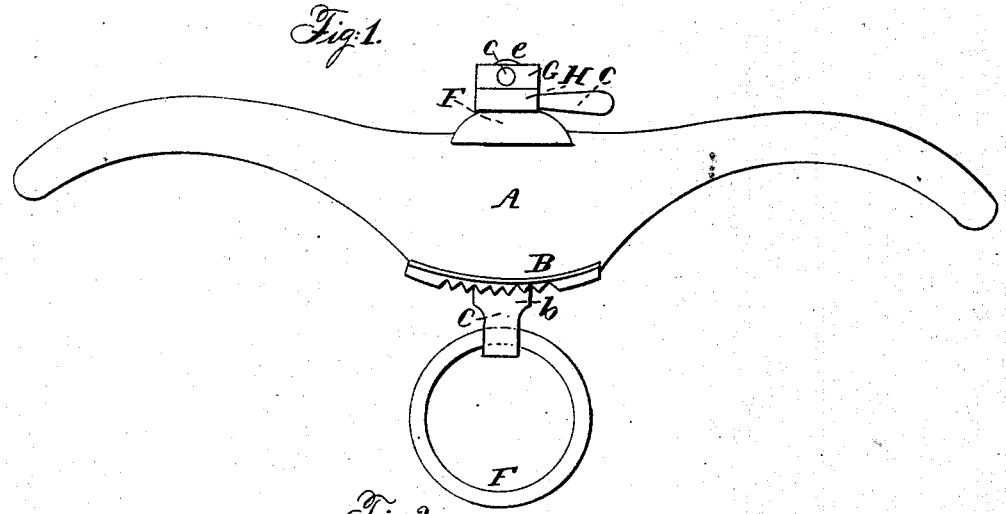
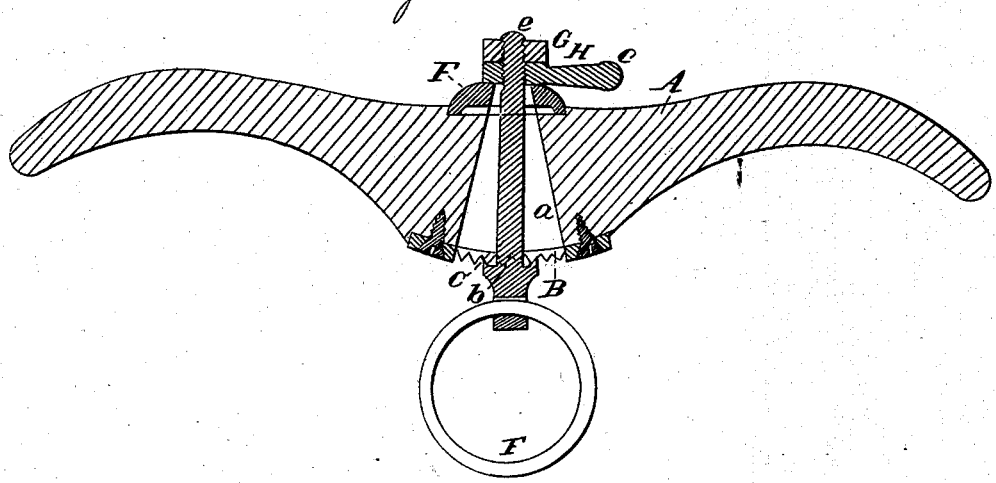
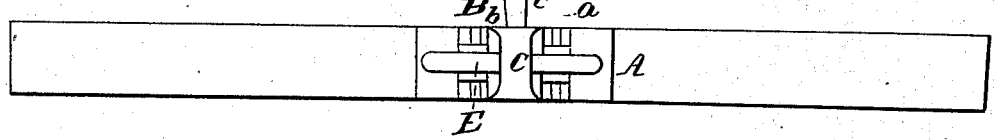
Witnesses
F. P. Hale Jr.
A. E. Fisher
Inventor:
W. R. Close
by his attorney
R. H. Eddy

UNITED STATES PATENT OFFICE.

W. R. CLOSE, OF BANGOR, MAINE.

IMPROVEMENT IN OX-YOKES.

Specification forming part of Letters Patent No. 47,523, dated May 2, 1865.

*To all whom it may concern:*

Be it known that I, W. R. CLOSE, of Bangor, in the county of Penobscot and State of Maine, have made a new and useful invention having reference to Ox-Yokes; and I do hereby declare the same to be fully described in the following specification and represented in the accompanying drawings, of which—

Figure 1 denotes a side elevation, Fig. 2 a longitudinal section, and Fig. 3 an under side view, of a yoke provided with my invention, the purpose of which is to effect the proper adjustment of the draft-ring in order to cause the leverage on the carriage-pole when connected with the yoke to be duly proportioned to the powers of the oxen when the yoke may be in use.

In the drawings, A denotes the yoke, which, at its middle, is furnished with a passage, $a$, extending down through it, such passage being tapering and wider at bottom than at its top, and opening through an arched rack, B, fixed to the under side of the yoke. The draft-ring E of the yoke depends from a vibratory hanger or bolt, C, having a head or catch block, $b$, made with teeth to enter the spaces between those of the rack B. The said hanger goes through a saddle-block, F, of metal fixed stationary in position on the top of the middle of the yoke. Where it projects above the saddle such hanger has a screw, $e$, upon which are screwed two nuts, G H, each of which has a handle, $c$, extending from it, as shown in Figs. 1 and 2.

The curve of the rack should have a radius equal or about equal to the distance of its middle from that of the upper surface of the saddle F, in order that the hanger C may be swung within the passage $a$, so as to move the catch-block $b$ more or less toward either extremity of the rack as circumstances may require. Thus, when one of the draft-animals may be more powerful or exert a greater impelling force on the yoke than the other, the part $b$ may be set or adjusted in the rack so as to duly proportion the leverage to the forces exerted on the yoke, and thus prevent the stronger ox from forcing and maintaining the yoke out of square with the pole.

I am aware that it is not new to combine with a yoke and its ring a means of adjusting the latter nearer to or farther from either end of the yoke as circumstances may require, and therefore I do not claim such as my invention, which consists in an improved mechanism for such purpose, it possessing the advantage of causing the yoke to be stronger or less liable to break at its middle than where the hanger-passage of it is of the same width from top to bottom of the yoke. Besides, with my invention it is easier to adjust the hanger than where the upper part of it has to be moved a like distance with its lower part.

What, therefore, I claim as my invention is—

My improved yoke-ring-adjusting mechanism as constructed of the supporting-saddle F, the vibratory hanger C, its catch-block $b$, its confining-screw and nut or nuts, and the curved rack D, arranged together and applied to the yoke in manner and so as to operate therewith substantially as and for the purpose specified.

W. R. CLOSE.

Witnesses:
A. L. SIMPSON,
H. L. MITCHELL.